US006799557B2

United States Patent
Fewell, Jr. et al.

(10) Patent No.: US 6,799,557 B2
(45) Date of Patent: Oct. 5, 2004

(54) PROCESSOR CONTROLLED DISCHARGE IGNITION WITH FIXED FIRING ANGLE AT STARTUP

(75) Inventors: Roy J. Fewell, Jr., Aiken, SC (US); Todd B. Johnson, Columbia, SC (US)

(73) Assignee: R. E. Phelon Company, Inc., Aiken, SC (US)

( * ) Notice: Subject to any disclaimer, the term of this patent is extended or adjusted under 35 U.S.C. 154(b) by 0 days.

(21) Appl. No.: 10/386,167

(22) Filed: Mar. 10, 2003

(65) Prior Publication Data

US 2003/0178005 A1 Sep. 25, 2003

Related U.S. Application Data

(60) Provisional application No. 60/363,656, filed on Mar. 12, 2002.

(51) Int. Cl.$^7$ ................................................. F02P 5/145
(52) U.S. Cl. .......................... 123/406.57; 123/406.54; 123/149 D
(58) Field of Search ....................... 123/406.56, 406.57, 123/406.54, 600, 601, 603, 149 D

(56) References Cited

U.S. PATENT DOCUMENTS

| | | | | |
|---|---|---|---|---|
| 3,874,349 A | * | 4/1975 | Fitzner ........................ | 123/600 |
| 4,245,591 A | | 1/1981 | Nishida et al. | |
| 4,527,522 A | | 7/1985 | Cerny | |
| 4,566,425 A | | 1/1986 | Nitou et al. | |
| 4,570,596 A | | 2/1986 | Sato | |
| 4,606,315 A | * | 8/1986 | Tobinaga et al. ...... | 123/406.55 |
| 4,620,521 A | | 11/1986 | Henderson et al. | |
| 4,696,273 A | | 9/1987 | Otobe et al. | |
| 4,757,797 A | | 7/1988 | Bengtsson | |
| 4,817,577 A | * | 4/1989 | Dykstra .................. | 123/406.56 |
| 4,911,126 A | * | 3/1990 | Notaras et al. ......... | 123/406.54 |
| 4,924,831 A | | 5/1990 | Piteo et al. | |
| 5,070,839 A | * | 12/1991 | Okuda .................... | 123/406.54 |
| 5,161,496 A | | 11/1992 | Matsushima et al. | |
| 5,170,760 A | | 12/1992 | Yamada et al. | |
| 5,209,202 A | | 5/1993 | Maurer et al. | |
| 5,331,935 A | * | 7/1994 | Daino .................... | 123/406.76 |
| 5,392,753 A | | 2/1995 | Burson et al. | |
| 5,875,763 A | * | 3/1999 | Mottier et al. ......... | 123/406.56 |
| 6,192,861 B1 | * | 2/2001 | Hamada et al. ......... | 123/149 D |

OTHER PUBLICATIONS

International Search Report from the PCT, dated Jul. 30, 2003.

* cited by examiner

Primary Examiner—Erick Solis
(74) Attorney, Agent, or Firm—Nelson Mullins Riley & Scarborough, LLP

(57) ABSTRACT

An ignition apparatus for use with an internal combustion engine to produce an electrical spark at a spark ignition device. The ignition apparatus includes triggering circuitry having a processor with stored timing data. The processor receives a signal indicative of the rotational position of the magnet and generates a triggering signal. The triggering circuitry switches between a first mode wherein the triggering signal occurs at a fixed time relative to top dead center and a second mode wherein the triggering signal occurs at a variable time relative to top dead center based on the stored timing data.

23 Claims, 8 Drawing Sheets

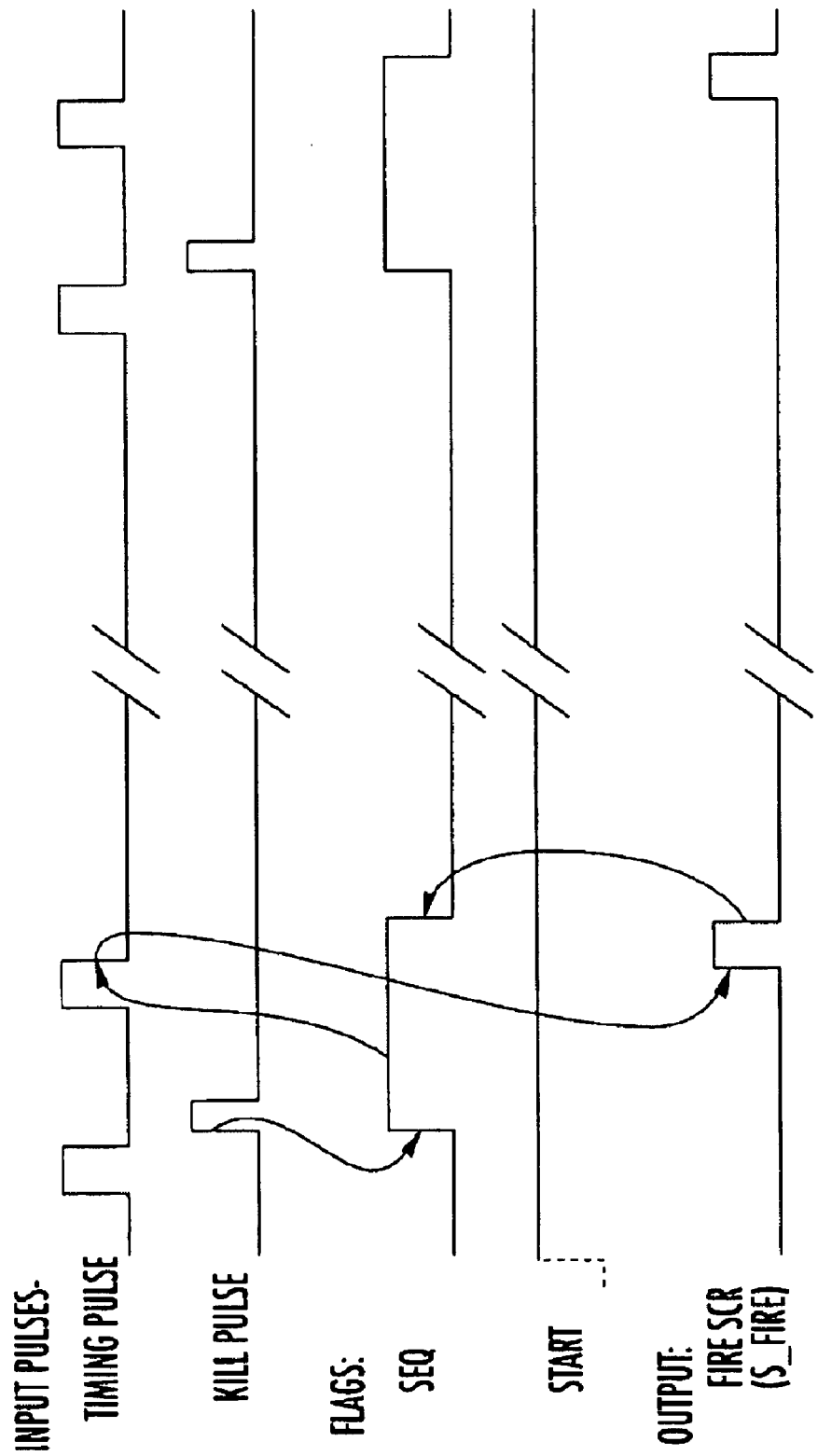

PROCESSOR CONTROLLED DISCHARGE IGNITION WITH FIXED FIRING ANGLE AT STARTUP

PRIORITY CLAIM

This application claims priority to U.S. Provisional Application Ser. No. 60/363,656, filed Mar. 12, 2002, which is incorporated herein by reference.

BACKGROUND OF THE INVENTION

The present invention generally relates to ignition systems for gasoline engines. More particularly, the invention relates to a discharge ignition apparatus having triggering circuitry that generates a triggering signal based upon stored timing data.

Ignition circuits of relatively elaborate design have often been provided to advance the ignition spark as engine speed is increased. For example, the spark may be delayed at starting speeds until approximately peak compression of the engine's piston. At higher engine speeds, the spark is preferably advanced to occur before peak compression.

U.S. Pat. No. 5,392,753 to Burson et al., incorporated herein by reference, shows an ignition circuit utilizing a microprocessor.

SUMMARY OF THE INVENTION

In one aspect, the present invention provides an ignition apparatus for use with an internal combustion engine to produce an electrical spark at a spark ignition device. The apparatus comprises a magnet assembly, including a pair of pole faces, operatively revolved along a circular path. A magnetically permeable core is mounted adjacent to the circular path and has at least two leg portions each including a respective end face. The leg portions of the magnetically permeable core are situated such that the pole faces pass proximate to the end faces during revolution of the magnet assembly. As a result, a time-varying magnetic flux is produced in the magnetically permeable core.

The ignition apparatus further includes a transformer having a primary coil and a secondary coil related by a predetermined step-up ratio. The secondary coil is electrically connected during operation to the spark ignition device. A spark generation circuit is operative to apply a primary voltage pulse to the primary coil responsive to a triggering signal. The primary voltage pulse produces a spark generating pulse in the secondary coil.

In addition, the ignition apparatus includes triggering circuitry having a processor with stored timing data. The processor is operative to receive a signal indicative of the rotational position of the magnet assembly and produce a triggering signal. In a first mode, the triggering signal occurs at a fixed angle relative to top dead center. In a second mode, the triggering signal occurs at a variable angle relative to top dead center based on the stored timing data.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which:

FIGS. 6a and 6b diagrammatically illustrate various timing plots from which operation of the circuit of FIG. 5 can be understood.

Figure 1:
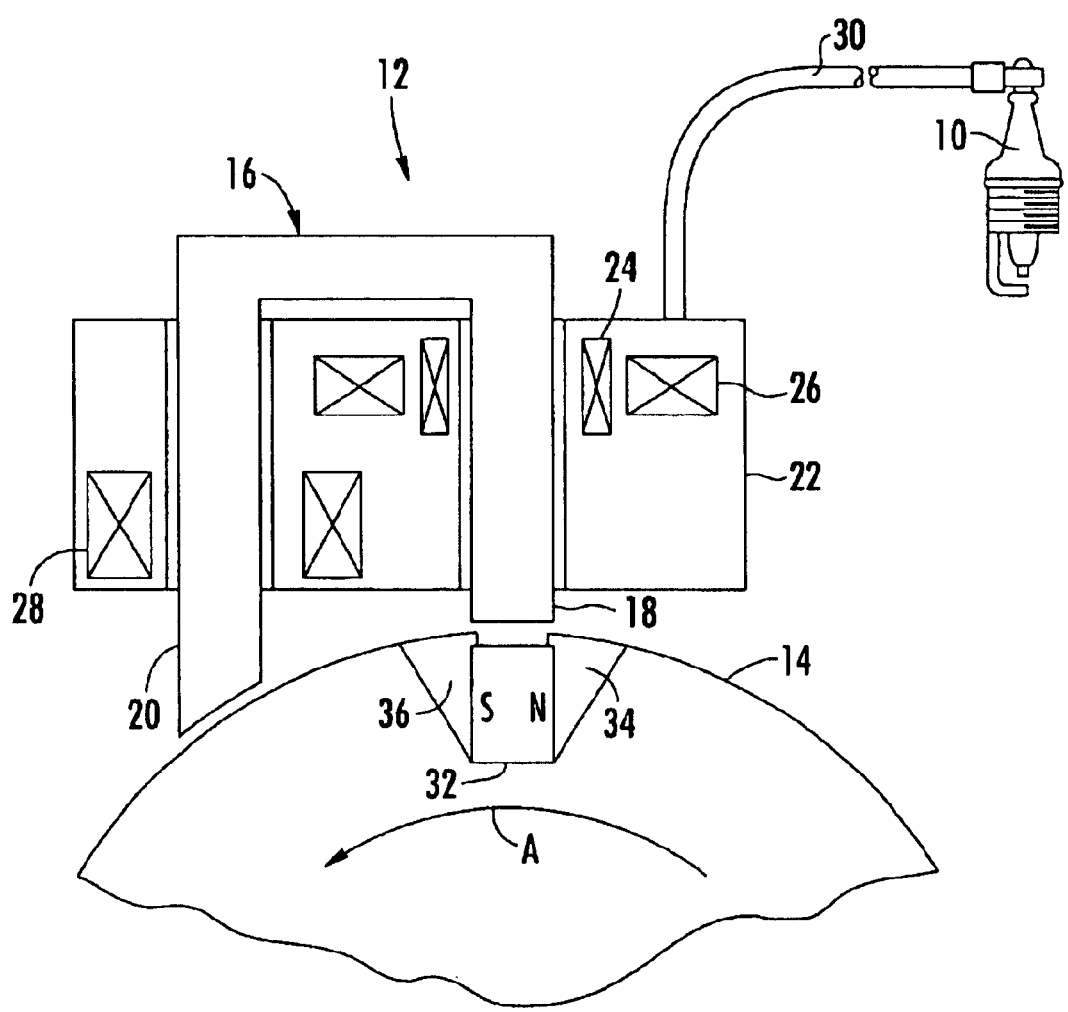
FIG. 1 is a diagrammatic elevational view showing various components in a discharge ignition system.

Repeat use of reference characters in the present specification and drawings is intended to represent same or analogous features or elements of the invention.

DETAILED DESCRIPTION

It is to be understood by one of ordinary skill in the art that the present discussion is a description of exemplary embodiments only and is not intended as limiting the broader aspects of the present invention, which broader aspects are embodied in the exemplary constructions.

FIG. 1 illustrates a discharge ignition apparatus that may be used with various devices powered by gasoline engines. The apparatus is configured to produce the requisite spark at spark plug 10 to ignite the air-fuel mixture within the piston cylinder of the engine. Generally, the apparatus includes a stator unit 12 and a rotatable flywheel 14. Flywheel 14 typically includes a central bore for mounting to a rotatable spindle mechanism interconnected with the engine's drive shaft. As a result, rotation of the spindle will produce a concomitant rotation of flywheel 14 (such as in the direction indicated by arrow A).

Stator unit 12, which typically remains fixed with respect to the engine during use, includes a magnetically permeable core 16. In this case, core 16 includes two depending leg portions, respectively indicated at 18 and 20. In many embodiments, however, the magnetically permeable core may be constructed having three such leg portions.

A sealed housing 22 maintains the various coils and other components utilized to produce a spark at spark plug 10. In particular, housing 22 includes a high voltage transformer having a primary coil 24 and a secondary coil 26. In the illustrated embodiment, coils 24 and 26 may be mounted coaxially about leg portion 18. A charge coil 28 provides a source of energy for the ignition spark as will be explained more fully below. In this case, charge coil 28 is mounted about leg portion 20 as shown.

The various coils and circuit components located within housing 22 may be protected and maintained securely in position by a suitable potting compound. Electrical connection with spark plug 10 is achieved by a typical interconnecting wire 30.

A magnet assembly is mounted adjacent the periphery of flywheel 14 to revolve about a circular path in synchronism with operation of the engine. The magnet assembly includes a permanent magnet 32 having pole pieces 34 and 36 mounted at respective ends thereof. It will be appreciated that the circumferential faces of pole pieces 34 and 36 will pass proximate to the end faces of leg portions 18 and 20 as flywheel 14 is rotated. Rotation of flywheel 14 thus produces a time-varying magnetic flux within core 16 as desired.

Figure 2:
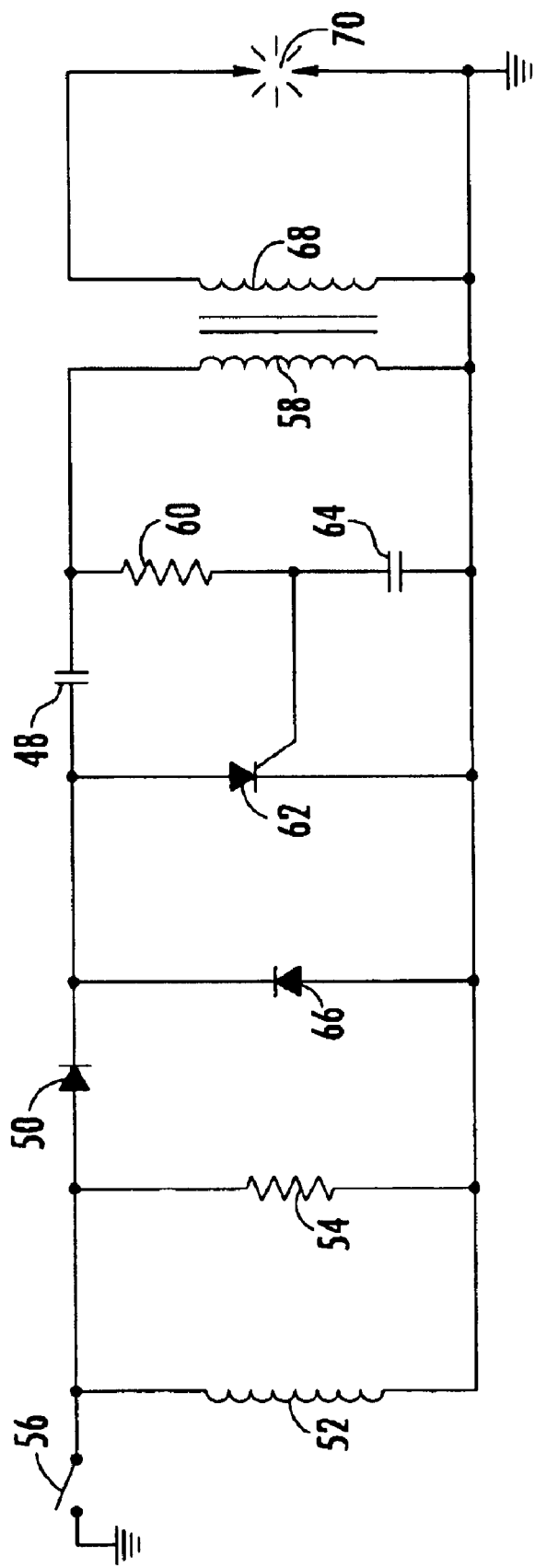
FIG. 2 is a schematic diagram illustrating a prior art ignition circuit.

FIG. 2 illustrates an example of a discharge circuit of the prior art. The circuit of FIG. 2 includes a charge capacitor 48 which is charged through rectifier diode 50 by a large positive pulse induced on charge coil 52. A resistor 54 is provided to attenuate transient voltages produced as diode 50 changes from forward conducting to reverse blocking. A stop switch 56 is provided to selectively ground charge coil 52 and thereby disable operation of the ignition system.

After capacitor 48 is charged, a relatively smaller positive pulse will be induced on primary coil 58 of the transformer. For example, the pulse induced on the primary coil may occur about 325° of rotation after the pulse induced on charge coil 52 in a system such as that shown in FIG. 1.

The positive primary coil signal is injected through a resistor 60 of relatively low resistance to the gate of silicon controlled rectifier (SCR) 62. When the triggering signal is produced in this manner by the voltage induced on primary coil 58, SCR 62 will be rendered conductive. As a result, capacitor 48 will discharge through primary coil 58. Capacitor 64 is optionally provided to shift the firing point a few degrees as may be required for a particular application. Ring-back diode 66 allows the tank circuit formed by capacitor 48 and the inductance of primary coil 58 to oscillate until all the energy initially stored in capacitor 48 dissipates.

The voltage appearing at primary coil 58 is stepped up by the predetermined ratio of the transformer. The higher voltage thus appearing at secondary coil 68 generates a spark across gap 70 of the spark plug. Because SCR 62 is fired at about the same point on the primary coil signal over the operating range of the engine, the timing is fixed at a predetermined number of degrees before top dead center (TDC).

Figure 3:
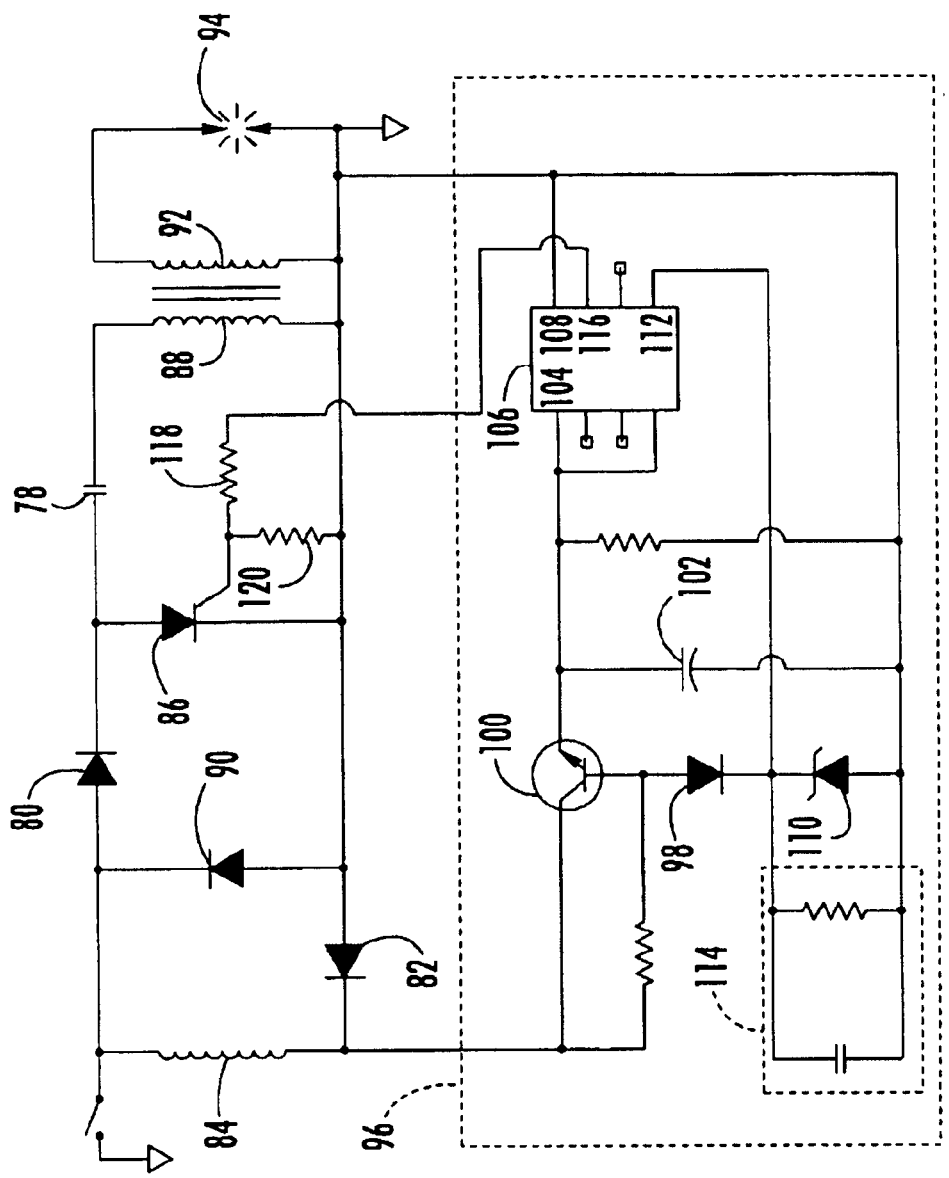
FIG. 3 is a schematic diagram of a prior art microprocessor controlled ignition circuit.

FIG. 3 illustrates a microprocessor controlled ignition discharge circuit constructed in accordance with the prior art. The discharge circuit of FIG. 3 includes a charge capacitor 78 which is charged through diodes 80 and 82 by a large positive pulse induced on charge coil 84. When a suitable switching element such as SCR 86 is rendered conductive, charge capacitor 78 discharges through the transformer's primary coil 88. The energy stored on capacitor 78 is permitted to oscillate in the conventional manner by ring back diode 90. The high voltage produced at secondary winding 92 is applied to spark plug gap 94.

The operation of triggering circuitry 96 will now be explained. The waveform produced by charge coil 84 consists of three pulses, a generally large positive pulse surrounded by a pair of generally smaller negative pulses. While the positive pulse is rectified by diodes 80 and 82 and stored on charge capacitor 78, the two negative pulses are presented as positive pulse inputs to triggering circuitry 96 due to the switching action of diodes 82 and 90.

These two positive pulses are rectified by diode 98 and are used by transistor 100 to charge capacitor 102. Capacitor 102 is connected to power input 104 of microcontroller unit or processor (MCU) 106, thereby powering the internal circuitry of MCU 106. Ground input 108 of MCU 106 is connected to an electrical ground within the circuit, as shown.

Zener diode 110 prevents capacitor 102 from providing excessive voltage to MCU 106. Transistor 100 will only conduct if the voltage on capacitor 102 is less than the voltage of zener diode 110. Accordingly, zener diode 110 limits charging of capacitor 102, thereby regulating the voltage that capacitor 102 provides to power input 104.

The two pulses presented to triggering circuitry 96 also appear on the cathode of zener diode 110. The pulses are limited to the zener voltage of zener diode 110 and are applied to pulse input 112 of MCU 106. MCU 106 uses these pulses presented to pulse input 112 for determining when to generate a triggering signal. A filter 114 suppresses noise that may be applied to input 112 of MCU 106.

MCU 106 contains a software program that generates a triggering signal by setting a positive pulse on fire output 116 at a selected time in the operational cycle. Fire output 116 is connected to the gate of SCR 86 through resistor 118. The positive pulse of fire output 116 gates SCR 86, thereby discharging charge capacitor 78. Resistor 120 serves to reduce noise on the gate input of SCR 86.

Figure 4:
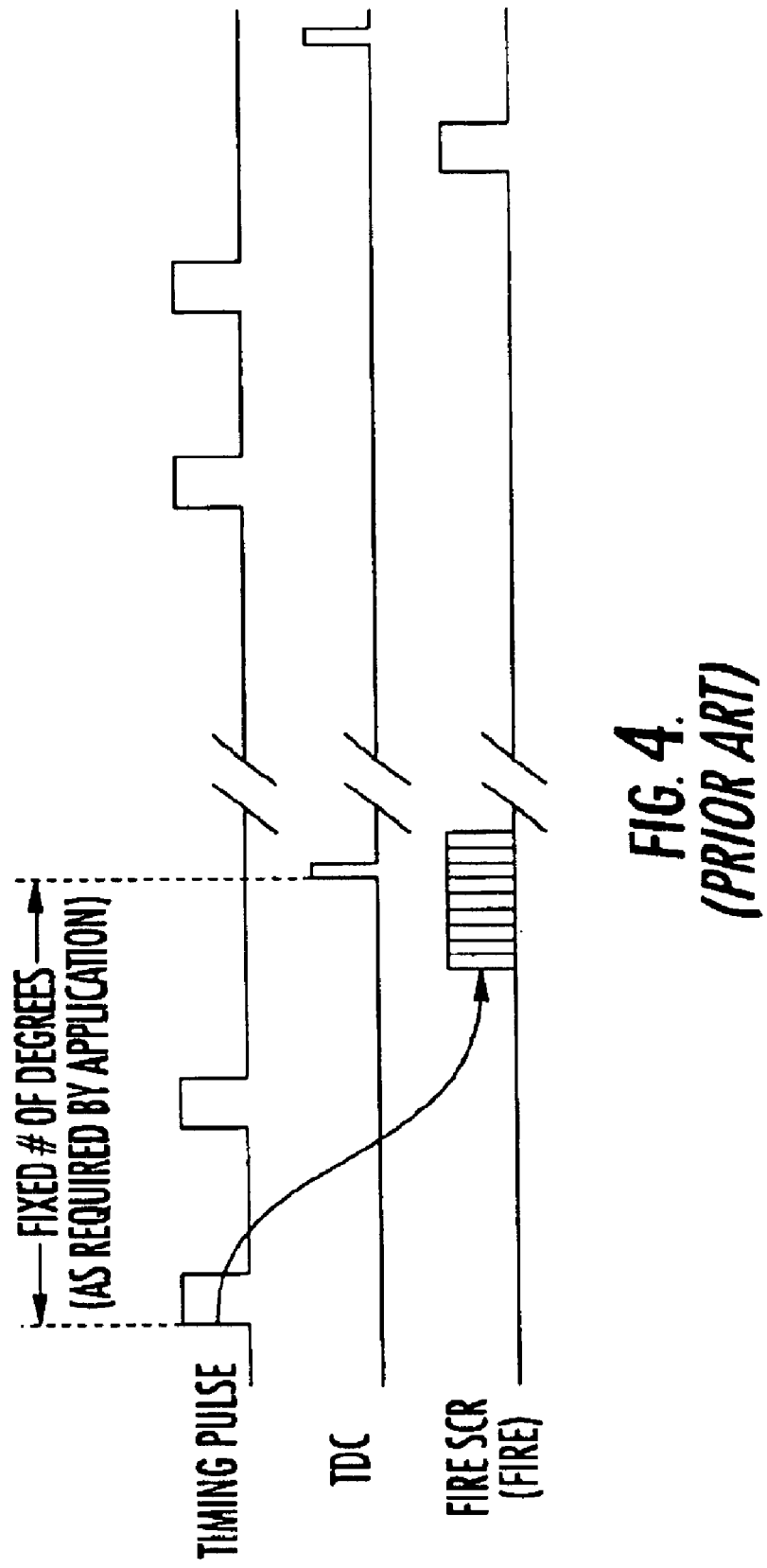
FIG. 4 diagrammatically illustrates various timing plots from which operation of the circuit of FIG. 3 can be understood.

FIG. 4 is an explanatory chart showing the timing for generating a triggering signal with the circuit of FIG. 3. During initial operation, startup is delayed until capacitor 102 has charged sufficiently to power MCU 106. The program running within MCU 106 also delays startup until input 112 has received sufficient timing pulses to calculate the pulse period and synchronize to the first pulse in the pulse pair (e.g., to the leading edge of the first pulse).

Once MCU 106 has synchronized to the first pulse, a delay time may be calculated based on the relationship between pulses and data contained in a lookup table stored on MCU 106. MCU 106 generates a triggering signal at varying times after the leading edge of the first pulse based upon the calculated delay time. For example, the calculated delay time may compensate for high engine speeds by advancing the triggering signal prior to top dead center (TDC).

The timing of generating a triggering signal can be adapted for many timing curves by adjusting the data in the lookup table, thereby improving starting ability and maximizing horsepower at operating speed. A maximum engine speed limit may also be set that prevents the ignition from firing. The timing could also be retarded as maximum speed is approached to cause the engine to lose power and limit the speed without cutting off the spark.

The discharge circuit shown in FIG. 3 work generally well, but does have shortcomings. For example, the spark plug cannot be fired until the program "sees" enough timing pulses to do the delay calculation and synchronize properly. In contrast, an analog circuit, such as shown in FIG. 2, can fire as soon as the charge capacitor is charged and a triggering signal is supplied to the SCR. As a result, the circuit shown in FIG. 3 may seem harder to start than an analog circuit.

Another disadvantage with the circuit of FIG. 3 is the potential for "kick back" in some circumstances. Kick back occurs when the charge in the cylinder is ignited at a point in the engine rotation that is too far in advance of TDC. As a result, the engine may attempt to run in the reverse direction.

Figure 5:
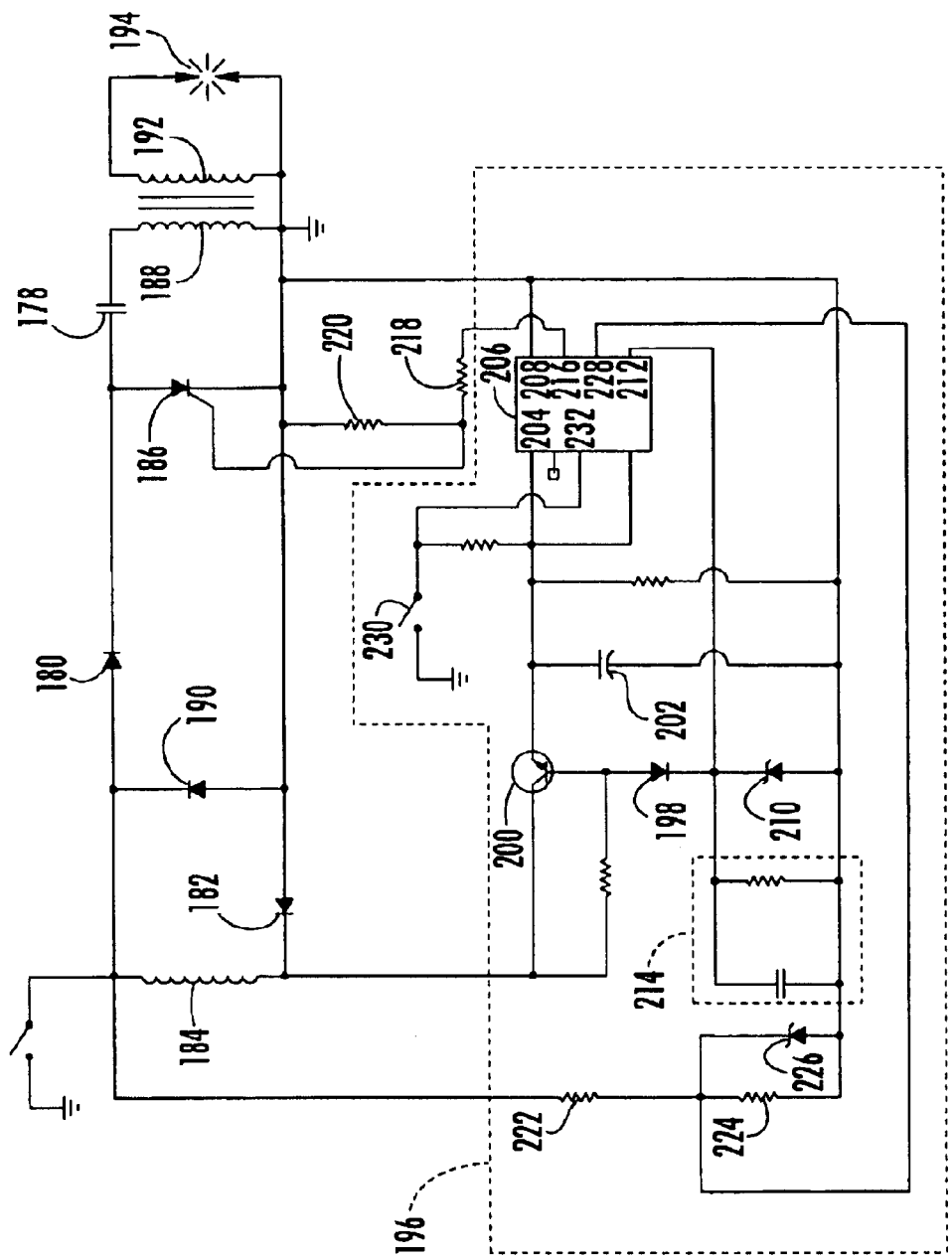
FIG. 5 is a schematic diagram of an exemplary ignition circuit constructed according to the present invention.

FIG. 5 illustrates a discharge circuit constructed in accordance with the present invention. The discharge circuit includes a charge capacitor 178 which is charged through diodes 180 and 182 by a large positive pulse induced on charge coil 184. When SCR 186 is rendered conductive, charge capacitor 178 discharges through the transformer's primary coil 188. The energy stored on capacitor 178 is permitted to oscillate in the conventional manner by ring back diode 190. The high voltage produced at secondary winding 192 is applied to spark plug gap 194.

The operation of triggering circuitry 196 will now be explained. The waveform produced by charge coil 184 consists of three pulses, a generally large positive pulse surrounded by a pair of generally smaller negative pulses.

While the positive pulse is rectified by diodes 180 and 182 and stored on charge capacitor 178, the two negative pulses are presented as positive pulse inputs to triggering circuitry 196 due to the switching action of diodes 182 and 190. These two pulses are referred to herein as Timing Pulses.

The Timing Pulses are rectified by diode 198 and are used by transistor 200 to charge an energy storage device, such as capacitor 202. Capacitor 202 is connected to power input 204 of microcontroller unit or processor (MCU) 206, thereby powering the internal circuitry of MCU 206. Ground input 208 of MCU 206 is connected to an electrical ground within the circuit, as shown.

Zener diode 210 prevents capacitor 202 from providing excessive voltage into MCU 206. Transistor 200 will only conduct if the voltage on capacitor 202 is less than the voltage of zener diode 210. Accordingly, zener diode 210 limits charging of capacitor 202, thereby regulating the voltage that capacitor 202 provides to power input 204.

The two Timing Pulses presented to triggering circuitry 196 also appear on the cathode of zener diode 210. The pulses are limited to the zener voltage of zener diode 210 and are applied to pulse input 212 of MCU 206. MCU 206 uses these pulses presented to pulse input 212 for determining when to generate a triggering signal. A filter 214 suppresses noise that may be applied to input 212 of MCU 206.

MCU 206 generates a triggering signal by setting a positive pulse on fire output 216. Fire output 216 is connected to the gate of SCR 186 through resistor 218. The positive pulse of fire output 216 gates SCR 186, thereby discharging charge capacitor 178. Resistor 220 serves to reduce noise on the gate input of SCR 186.

Triggering circuitry 196 also uses the generally large positive pulse generated by the charge coil 184. This signal, hereinafter referred to as the "Kill Pulse," is attenuated by resistors 222 and 224 and is sufficiently limited by zener diode 226 to prevent overdriving of MCU 206. (This signal is referred to as the "Kill Pulse" because of the location in the circuit at which it is derived, not because it has anything to do with the kill function.) The Kill Pulse is presented to input 228 of MCU 206. MCU 206 uses the Kill Pulse in conjunction with the Timing Pulses to determine when to generate a triggering signal as will be described.

In this embodiment, triggering circuitry 196 also contains an optional switch input 230 to MCU 206 on input 232. Switch input 230 provides the option of having a shut down function that is under program control and may be used to give a positive shut down at any time switch input 230 is momentarily activated.

Figure 6B:
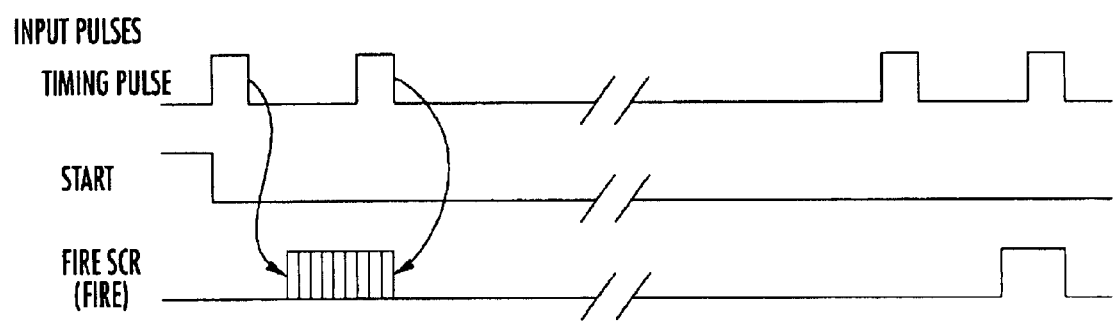

FIGS. 6a and 6b illustrate explanatory charts showing the timing for generating a triggering signal with the circuit of FIG. 5. In this case, MCU 206 contains a software program for determining the timing of generating a triggering signal operating in a Start Mode (FIG. 6a) or a Run Mode (FIG. 6b). It should be understood, however, that dedicated circuitry, such as an application specific integrated circuit (ASIC) could also be provided for this purpose. "SEQ" and "START" are internal flags used by MCU 206 to control the start up process. "Fire SCR" corresponds with generation of the triggering signal.

The flag labeled START will be set when power input 204 of MCU 206 is sufficiently powered. The START flag will preferably stay set until the MCU enters into Run Mode. When the first of the two Timing Pulses is detected, the period of revolution is stored and a delay time is calculated but will not be used as long as MCU 206 is in the START mode. MCU 206 "knows" that this is the first Timing Pulse because SEQ is not active. When the leading edge of the Kill Pulse is detected, the SEQ flag is set. Since MCU 206 is in the START mode, the program now looks for the trailing edge of the second Timing Pulse. When this is detected the triggering signal is generated which in turn fires the spark plug as previously described. Preferably, the triggering signal is held active for a period of time sufficent to allow noise cause by firing the spark plug to stop. The SEQ is then reset and the program will again look for the first timing pulse.

The START Mode sequence will continue until a predetermined speed is reached and the START flag is reset. Specifically, the START flag is reset when the first Timing Pulse is detected and the period stored is shorter than the threshold that keeps MCU 206 in the START mode. When the START flag is reset, MCU 206 enters into the Run Mode.

In the Run Mode, the delay time is calculated from the period of the Timing Pulses. In this mode, timing data stored in MCU 206 is used to time firing of the spark plug. Typically, the first Timing Pulse is utilized for this purpose. (In such embodiments, the second Timing Pulse can simply be skipped over.) One skilled in the art will note that FIG. 6b shows the generation of a triggering signal based upon detecting the trailing edge of the first timing pulse. In accordance with the present invention, this is often preferable because the trailing edge varies less over the RPM range and therefore requires less drift compensation. However, it should be understood that MCU 206 could also be adapted to use the leading edge.

As can be seen from FIG. 6a, the spark plug can be fired in the START mode immediately after a Kill Pulse is detected followed by a Timing Pulse input. As a result, the spark plug can be fired as soon as MCU 206 receives sufficient power. (In other words, there is no need to wait for a full period to be timed before firing.) Also, since the triggering signal is generated upon the actual edge of a pulse with no delay, the triggering circuitry will always generate a triggering signal at the same point relative to TDC, thus preventing kick back. During START mode, this point may typically fall within a range of about 10° to 12° before TDC. During RUN mode, triggering can be further advanced (such as up to the 25° to 30° range). The speed governing options previously discussed could also be adapted to the triggering circuitry of this embodiment.

Figure 7:
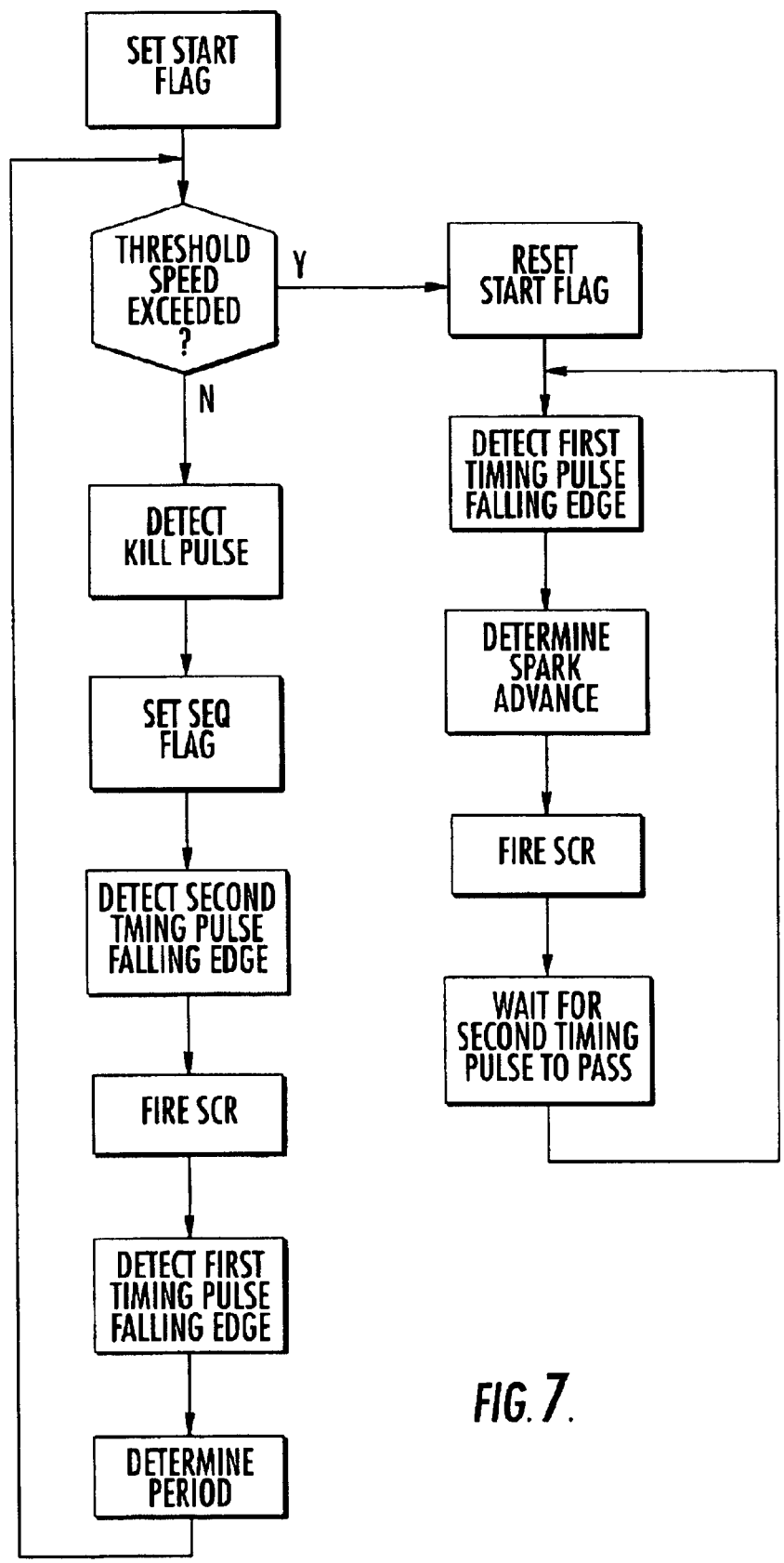
FIG. 7 is an exemplary flow chart illustrating the processor program used to control generation of a triggering signal in the circuit of FIG. 5.

FIG. 7 shows an exemplary flow chart illustrating the processor program used to control the timing of generating a triggering signal in accordance with the circuit of FIG. 5. One of ordinary skill in the art should recognize that other methods exist for determining proper timing of generating a triggering signal and such are included within the scope of the present invention.

While preferred embodiments of the invention have been shown and described, modifications and variations may be made thereto by those of skill in the art without departing from the spirit and scope of the present invention. For example, it may be desirable in some circuit arrangements to substitute inductors or other circuit components for various energy storage elements. Moreover, circuit arrangements are contemplated where the charge coil and transformer are both located on the same leg portion. In this case, the phasing of the trigger signal may need to be different from that described above so as to ensure that the charge capacitor will be fully charged.

It should also be understood that aspects of various embodiments may be interchanged both in whole or in part.

Furthermore, those of ordinary skill in the art will appreciate that the foregoing description is by way of example only, and is not intended to be limitative of the invention so further described in the appended claims.

What is claimed is:

1. An ignition apparatus for use with an internal combustion engine to produce an electrical spark at a spark ignition device, said apparatus comprising:
   a magnet assembly operatively revolved along a circular path, said magnet assembly including a pair of pole faces;
   a magnetically permeable core mounted adjacent to said circular path and having at least two leg portions each including a respective end face, said leg portions being situated such that said pole faces pass proximate to said end faces during revolution of said magnet assembly and produce a time-varying magnetic flux in said magnetically permeable core;
   a transformer having a primary coil and a secondary coil related by a predetermined step-up ratio, said secondary coil electrically connected during operation to the spark ignition device;
   a spark generation circuit operative to apply a primary voltage pulse to said primary coil responsive to a triggering signal, said primary voltage pulse producing a spark generating pulse in said secondary coil; and
   triggering circuitry including a processor operative to receive a signal indicative of the rotational position of said magnet and generate a triggering signal, said triggering circuitry being operative to switch between a first mode wherein said triggering signal occurs at a fixed angle relative to top dead center and a second mode wherein said triggering signal occurs at a variable angle relative to top dead center.

2. The ignition apparatus as set forth in claim 1, wherein said triggering circuitry operates in said first mode at startup.

3. The ignition apparatus as set forth in claim 2, wherein said triggering circuitry operates in said first mode until a predetermined rotational speed of said magnet assembly is reached.

4. The ignition apparatus as set forth in claim 3, wherein said triggering circuitry switches to said second mode upon reaching said predetermined rotational speed.

5. The ignition apparatus as set forth in claim 1, wherein said triggering signal in said second mode is advanced with respect to said triggering signal in said first mode.

6. The ignition apparatus as set forth in claim 1, wherein said processor has stored timing data and said variable angle is determined based on said stored timing data.

7. An ignition apparatus as set forth in claim 1, wherein said spark generation circuit comprises:
   (a) an energy storage element;
   (b) a charge coil having a voltage induced thereon by said magnetic flux to supply charging energy to said energy storage element during each revolution of said magnet assembly; and
   (c) an electronic switch electrically connected in circuit with said energy storage element and said primary coil, said electronic switch being rendered conductive by application of said triggering signal thereto.

8. An ignition apparatus as set forth in claim 7, wherein said energy storage element is a charge capacitor.

9. An ignition apparatus as set forth in claim 7, wherein said electronic switch is an SCR.

10. An ignition apparatus as set forth in claim 7, wherein said magnet assembly is carried by a rotatable engine flywheel.

11. An ignition apparatus for use with an internal combustion engine to produce an electrical spark at a spark ignition device, said apparatus comprising:
   a magnet assembly operatively revolved along a circular path, said magnet assembly including a pair of pole faces;
   a magnetically permeable core mounted adjacent to said circular path and having at least two leg portions each including a respective end face, said leg portions being situated such that said pole faces pass proximate to said end faces during revolution of said magnet assembly and produce a time-varying waveform in said magnetically permeable core having a first pulse, a second pulse and a third pulse;
   a transformer having a primary coil and a secondary coil related by a predetermined step-up ratio, said secondary coil electrically connected during operation to the spark ignition device;
   a spark generation circuit operative to apply a primary voltage pulse to said primary coil responsive to a triggering signal, said primary voltage pulse producing a spark generating pulse in said secondary coil; and
   triggering circuitry including a processor having stored timing data, said processor operative to receive said first pulse, said second pulse and said third pulse and generate a triggering signal, said triggering circuitry being operative to switch between a first mode and a second mode wherein said triggering signal occurs at a fixed angle relative to top dead center in said first mode and at a variable angle relative to top dead center based on said stored timing data in said second mode.

12. The ignition apparatus as set forth in claim 11, wherein said triggering circuitry in said first mode generates a triggering signal simultaneous with detecting said third pulse.

13. The ignition apparatus as set forth in claim 11, wherein said triggering circuitry in said first mode generates a triggering signal simultaneous with detecting the falling edge of said third pulse.

14. The ignition apparatus as set forth in claim 12, wherein said triggering circuitry is in said second mode generates a triggering signal at a selected time relative to said first pulse.

15. The ignition apparatus as set forth in claim 13, wherein said triggering signal occurs when said triggering circuitry is in said second mode at a selected time measured from said falling edge of said first pulse.

16. The ignition apparatus as set forth in claim 12, wherein detection of said second pulse enables generation of said triggering signal upon detecting said third pulse.

17. The ignition apparatus as set forth in claim 12, wherein said triggering circuitry operates in said first mode upon startup.

18. The ignition apparatus as set forth in claim 17, wherein said triggering circuitry switches to said second mode upon reaching a predetermined rotational speed of said magnet assembly.

19. An ignition apparatus for use with an internal combustion engine to produce an electrical spark at a spark ignition device, said apparatus comprising:
   a magnet assembly operatively revolved along a circular path, said magnet assembly including a pair of pole faces;

a magnetically permeable core mounted adjacent to said circular path and having at least two leg portions each including a respective end face, said leg portions being situated such that said pole faces pass proximate to said end faces during revolution of said magnet assembly and produce a time-varying magnetic flux in said magnetically permeable core;

a transformer having a primary coil and a secondary coil related by a predetermined step-up ratio, said secondary coil electrically connected during operation to the spark ignition device;

a spark generation circuit operative to apply a primary voltage pulse to said primary coil responsive to a triggering signal, said primary voltage pulse producing a spark generating pulse in said secondary coil; and triggering means for generating a triggering signal, said triggering means having a first mode wherein said triggering signal occurs at a fixed angle relative to top dead center and a second mode wherein said triggering signal occurs at a variable angle relative to top dead center, said triggering means being capable of switching between said first mode and said second mode.

20. A method for controlling the timing of a spark generation circuit for an internal combustion engine, said method comprising the steps of:

(a) detecting the speed of an engine based on the period between two timing pulses, said timing pulses being separated by a kill pulse;

(b) if said speed is below a predetermined threshold, producing a triggering signal at a first mode time determined in relation to said kill pulse; and (c) if said speed is above said predetermined threshold, producing a triggering signal at a second mode time determined in relation to one of said timing pulses.

21. A method as set forth in claim 20, wherein said first mode is angularly fixed in relation to said kill pulse.

22. A method as set forth in claim 20, wherein said second mode time is angularly variable in relation to said timing pulse based upon said engine speed.

23. A method as set forth in claim 22, wherein said timing pulse from which said second mode time is determined is the first timing pulse.

* * * * *